United States Patent Office 3,442,889
Patented May 6, 1969

3,442,889
HALOBENZYL CARBAMATES
John J. D'Amico, Dunbar, W. Va., assignor to Monsanto Company, St. Louis, Mo., a corporation of Delaware
No Drawing. Continuation-in-part of application Ser. No. 55,111, Sept. 12, 1960. This application June 14, 1965, Ser. No. 463,946
Int. Cl. C07c 125/06; C07d 29/24, 41/02
U.S. Cl. 260—239      15 Claims

ABSTRACT OF THE DISCLOSURE

Halobenzzyl carbamates, useful as herbicides, of the formula

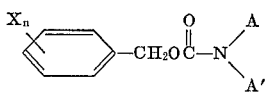

where X is halogen, n is 2 or 3, and A and A' are either independent organic substituents or taken together with the nitrogen form a heterocyclic ring.

---

This application is a continuation-in-part of Ser. No. 55,111 filed Sept. 12, 1960, now abandoned.

The present invention relates to new halobenzyl esters of the general formula

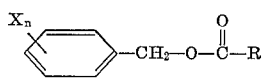

where X is halogen, n is 2 or 3 and R is an amino radical. The halogen substituents are preferably chlorine but bromine and to a lesser extent fluorine and iodine are also suitable. When n is 2, compounds containing halogen in the 2,5- and 2,6-positions are preferred. Examples of amino radicals are disubstituted $NH_2$ wherein the substituents may be lower alkyl, alkoxy substituted lower alkyl, lower olefinic, halogen substituted lower olefinic and cycloalkyl with the proviso that not more than one is cycloalkyl and radicals derived by removal of the hydrogen from the nitrogen of pyrrolidine, piperidine, hexamethyleneimine and lower alkyl substituted derivatives thereof. Cyclohexyl is the preferred cycloalkyl group but cyclopentyl and lower alkyl substituted cyclohexyl and cyclopentyl radicals confer similar properties. These compounds are useful for destroying or retarding undesired vegetation. Furthermore, they are useful as toxic constituents in fungicidal compositions. In addition, they are useful adjuvants for the compounding of mineral lubricating oils. They are readily soluble in mineral oil fractions and have the property of increasing the load carrying capacity of mineral oil lubricants. Additionally, these compounds are useful as intermediates. For example, amides result from condensation with amines.

The halobenzyl esters of this invention may be prepared by condensing a halogenated benzyl alcohol with a carbonyl halide. The compounds designated ar,ar,ar-trichlorobenzyl esters were derived from reaction of a carbonyl halide with a mixer isomer of a halogenated benzyl alcohol containing an average of three halogen atoms in the carbocyclic ring prepared by the following procedure: Substantially 1500 parts by weight of dry toluene was charged into a chlorinator of suitable capacity. Substantially 15 parts by weight of iron fillings were added as catalyst carrier for ring chlorination and chlorine introduced at about 20° C. During the last part of the run the temperature was increased to about 70° C. in order to keep the reaction mixture fluid and the flow of chlorine continued until the increase in weight corresponded to that calculated for trichlorotoluene. Thus, when the product analyzed 54.8% chlorine, the flow of chlorine was interrupted and the trichlorotoluene given a 10% caustic wash and filtered through a bed of clay in order to remove the iron. Substantially 415 grams (2.12 moles) of trichlorotoluene thus prepared was charged to a 1-liter flask and heated to 150° C. A sunlamp was placed about 8 inches from the flask to activate bromination. Substantially 339 grams (4.45 moles) of bromine was fed in below the surface over a 60 minute period at 150°–160° C. The product was allowed to cool over night and then vacuum treated under 30 mm. pressure. Trichlorobenzyl bromide was obtained in theory yield. It was predominantly the 2,3,6-isomer.

Substantially 452 grams (1.59 moles) of the trichlorobenzyl bromide was charged to a reactor with 169 grams (1.59 moles) of sodium carbonate and 1510 grams of water. The mixture was heated at refluxing temperature (95°–100° C.) for 72 hours. After cooling to 25° C., salt was added to saturate the solution and salt out the upper product layer which was then separated and extracted with ether. The ether was removed by distillation in vacuo at a maximum temperature of 80°–90° C./5–10 mm. ar,ar,ar-trichlorobenzyl alcohol was obtained in 97.5% yield as an oil which solidified on standing. Analysis gave 51% chlorine as compared to a calculated value of 50.4% chlorine.

As illustrative of the new compounds and their method of preparation, the following examples are given:

Example 1

To a mixture of 21.1 grams (0.1 mole) of the ar,ar,ar-trichlorobenzyl alcohol prepared as described above, 4 grams (0.1 mole) of sodium hydroxide and 100 ml. of acetone there was added dropwise with stirring over a period of 10 minutes 19 grams (0.1 mole) of N-cyclohexyl N-ethyl carbonyl chloride. The reaction mixture was then heated at 50°–56° C. for 6 hours. After cooling to 25° C., 250 ml. of water and 300 ml. of ethyl ether were added and stirring continued for 15 minutes. The ether solution was washed with water until neutral to litmus, dried over sodium sulfate and the ether removed in vacuo at a maximum temperature of 80°–90° C./1–2 mm. ar,ar,ar - trichlorobenzyl N - ethylcyclohexanecarbamate was obtained as a tan semi-solid in 82.0% yield. It was soluble in ether, acetone, benzene, heptane and ethanol but insoluble in water. Analysis gave 3.2% nitrogen compared to 3.8% calculated for $C_{16}H_{20}Cl_3NO_2$.

Example 2

To a stirred solution comprising 21.1 grams (0.1 mole) of the aforedescribed mixed isomer of trichlorobenzyl alcohol, 100 ml. of ethyl acetate and 12 ml. of triethylamine there was added in one portion 13.6 grams (0.1 mole) of diethyl carbonyl chloride. The mixture was then heated and maintained at reflux temperature for 5 hours. After cooling to 25° C., 100 ml. of water was added and stirring continued for 15 minutes. The top ethyl acetate layer was washed with water until neutral to litmus and dried over sodium sulfate. The solvent was removed in vacuo at a maximum temperature of 80°–90° C./1–2 mm. ar,ar,ar-Trichlorobenzyl diethylcarbamate was obtained as a semi-solid in 90% yield. It was soluble in acetone and ethanol, slightly soluble in ether and benzene but insoluble in heptane and water. Analysis gave 4.6% nitrogen compared to 4.5% calculated for $C_{12}H_{14}Cl_3NO_2$.

Example 3

To a stirred solution comprising 52.9 grams (0.25 mole) of the mixed isomer of trichlorobenzyl alcohol described, 35 grams (0.25 mole) of potassium carbonate and 300 ml. of heptane was added in one portion 30.9 grams (0.25 mole) of pyrrolidinyl carbonyl chloride. The mixture was then heated and maintained at reflux temperature for 6 hours, filtered hot and the solvent removed in vacuo at a maximum temperature of 80°–90° C./1–2 mm. ar,ar,ar-Trichlorobenzyl 1-pyrrolidinylcarboxylate was obtained as an amber oil in 87.0% yield. It was soluble in ether, acetone, benzene, heptane and ethanol but insoluble in water.

The mixed isomer of trichlorobenzyl alcohol described and the general procedure of Example 3 were used in Examples 4–9. The products were all amber oils possessing the same solubilities as in Example 3.

Example 4 ar,ar,ar-Trichlorobenzyl 1-piperidinecarboxylate was obtained from 1-piperidinylcarbonyl chloride in 99.5% yield.

Example 5 ar,ar,ar-Trichlorobenzyl N,N-bis(2-chloroallyl)carbamate was obtained from bis(2-chloroallyl)carbonyl chloride in 99.5% yield.

Example 6 ar,ar,ar-Trichlorobenzyl N,N-diallylcarbamate was obtained from diallyl carbonyl chloride in 99% yield.

Example 7 ar,ar,ar-Trichlorobenzyl N-allylcyclohexanecarbamate was obtained from N-allycyclohexyl carbonyl chloride in 95.5% yield.

Example 8 ar,ar,ar-Trichlorobenzyl diisopropylcarbamate from diisopropyl carbonyl chloride in 97.5% yield.

Example 9 ar,ar,ar-Trichlorobenzyl N-(2-chloroallyl)cyclohexanecarbamate from N-(2-chloroallyl)cyclohexyl carbonyl chloride in 73% yield.

Example 10

To a stirred solution comprising 44.3 grams (0.25 mole) of 2,6-dichlorobenzyl alcohol and 300 ml. of benzene was added 34 grams (0.25 mole) of diethyl carbonyl chloride. While stirring the mixture it was heated and maintained at reflux temperature for 18 hours. After cooling to 25° C., 200 ml. of water was added and stirring continued for 15 minutes. The benzene layer was washed with water until neutral to litmus and dried over sodium sulfate. Benzene was removed in vacuo at 80°–90° C./1–2 mm. The residue was a semi-solid obtained in 94% yield. After drying on a porous plate 2,6-dichlorobenzyl diethylcarbamate was obtained as a white solid, M.P. 58°–60° C. Analysis gave 5.1% nitrogen and 25.5% chlorine as compared to 5.1% nitrogen and 25.7% chlorine calculated for $C_{12}H_{15}Cl_2NO_2$.

Example 11

To a stirred solution comprising 17.7 grams (0.1 mole) of 2,5-dichlorobenzyl alcohol, 150 ml. of heptane and 13.9 grams (0.1 mole) of potassium carbonate was added in one portion 19 grams (0.1 mole) of N-cyclohexyl N-ethylcarbonyl chloride. The mixture was then heated and maintained at reflux temperature for 6 hours, filtered hot to remove salt and the solvent removed in vacuo at a maximum temperature of 80°–90° C./1–2 mm. 2,5-dichlorobenzyl N-ethylcyclohexanecarbamate was obtained as an amber oil in 94% yield. Analysis gave 4.0% nitrogen compared to 4.2% calculated for $C_{14}H_{16}Cl_2NO_2$.

Example 12

Substituting 2,6-dichlorobenzyl alcohol for the 2,5-dichlorobenzyl alcohol in the procedure of Example 11 gave 2,6-dichlorobenzyl N-ethylcyclohexanecarbamate in 93.9% yield. The product solidified on standing. After drying on a porous plate it was a tan solid, M.P. 162°–164° C. Analysis gave 22.0% chlorine as compared to 21.5% calculated for $C_{16}H_{21}Cl_2NO_2$.

Other examples are recorded below. These are merely cited further to illustrate the invention and variations will be evident to those skilled in the art:

ar,ar,ar-trichlorobenzyl dibutylcarbamate
ar,ar,ar-trichlorobenzyl dipropylcarbamate
ar,ar,ar-trichlorobenzyl diisopropylcarbamate
ar,ar,ar-trichlorobenzyl N-(methoxypropyl)cyclohexanecarbamate
ar,ar,ar-trichlorobenzyl N-(methoxyethyl)cyclohexanecarbamate
ar,ar,ar-trichlorobenzyl N-allyl N-methoxypropylcarbamate
ar,ar,ar-trichlorobenzyl N-allyl N-methoxyethylcarbamate
ar,ar,ar-trichlorobenzyl N,N-bis(methoxyethyl)carbamate
ar,ar,ar-trichlorobenzyl N,N-bis(methoxypropyl) carbamate
ar,ar,ar-trichlorobenzyl N,N-bis(methoxybutyl)carbamate
ar,ar,ar-trichlorobenzyl N,N-bis(ethoxyethyl)carbamate
ar,ar,ar-trichlorobenzyl 1-hexamethyleniminecarboxylate
ar,ar,ar-trichlorobenzyl 5-ethyl-2-methylpiperidine-carboxylate
ar,ar,ar-trichlorobenzyl 2-methyl-1-piperidinecarboxylate
2,6-dichlorobenzyl 1-pyrrolidinecarboxylate
2,5-dichlorobenzyl 1-pyrrolidinecarboxylate
2,6-dichlorobenzyl 1-piperidinecarboxylate
2,5-dichlorobenzyl 1-piperidinecarboxylate
2,6-dichlorobenzyl 2-methyl-1-piperidinecarboxylate
2,6-dichlorobenzyl 5-ethyl-2-methylpiperidinecarboxylate
2,6-dichlorobenzyl 1-hexamethyleniminecarboxylate
2,5-dichlorobenzyl 1-hexamethyleniminecarboxylate
2,6-dichlorobenzyl N-(methoxypropyl)cyclohexanecarbamate
2,6-dichlorobenzyl N-(methoxyethyl)cyclohexanecarbamate
2,6-dichlorobenzyl N-allyl N-methoxypropylcarbamate
2,5-dichlorobenzyl N-allyl N-methoxyethylcarbamate
2,5-dichlorobenzyl N,N-bis(methoxyethyl)carbamate
2,6-dichlorobenzyl N,N-bis(methoxyethyl)carbamate
2,6-dichlorobenzyl N,N-bis(ethoxyethyl)carbamate
2,6-dichlorobenzyl N,N,-bis(ethoxybutyl)carbamate
2,4,5-trichlorobenzyl diethylcarbamate
2,4,5-tribromobenzyl diethylcarbamate
2,4,6-trichlorobenzyl dipropylcarbamate
2,4,6-tribromobenzyl dipropylcarbamate
2,3,6-trichlorobenzyl diethylcarbamate
2,3,6-tribromobenzyl diethylcarbamate
2,3,4-trichlorobenzyl diethylcarbamate
2,3,4-tribromobenzyl diethylcarbamate
2,3,5-trichlorobenzyl diethylcarbamate
2,3-dichlorobenzyl diethylcarbamate
3,4,5-trichlorobenzyl diethylcarbamate Herbicidal compositions may be prepared by admixing the ester with a carrier material in order to provide formulations adapted for ready and efficient application in liquid or solid form. Solid compositions are formulated by mixing the toxicant with a finely divided or granular solid, as for example tricalcium phosphate, calcium carbonate, kaolin, bole, kieselguhr, talc, bentonite, fuller's earth, pyropyhllite, diatomaceous earth, calcined magnesia, volcanic ash, sulfur and the like inorganic solid materials, and include for example such materials of organic nature as powdered cork, powdered wood, and powdered walnut shells. The preferred solid carriers are the adsorbent clays, e.g. bentonite. These mixtures can be used for herbicidal purposes in the dry form, or by addition of water-soluble surfactants the dry particular solids can be rendered wettable by water so as to obtain stable aqueous dispersions of suspensions suitable for use as sprays. The carrier will be in major proportion and the toxicant, while less than 50% of the composition, will be present in herbicidally effective proportion.

Useful properties as herbicides are illustrated by applying the esters as aqueous sprays to germinating seedlings. The active ingredient was emulsified in water and applied to seeded soil at the rate of 5 pounds per acre. About fourteen days after application of the toxicants results were observed and recorded. The number of seeds emerging was converted to weighted herbicidal ratings based on average percent germination of any particular seed lot times an injury factor. This evened irregularities of herbicide ratings of seeds which varied in percent germination. The injury factor took into consideration any plants not expected to survive. Thus, phystotoxicity ratings were based on the number of plants which emerged and would survive as observed two weeks after planting. Herbicidal ratings were assigned by means of the following conversion scale:

| Percent emergence: | Phytotoxicity rating |
|---|---|
| 0–25 | 3 or severe. |
| 26–50 | 2 or moderate. |
| 51–75 | 1 or slight. |
| 76–100 | 0 or none. |

The phytotoxicities are recorded below:

TABLE I

| Toxicant | Results observed |
|---|---|
| ar,ar,ar-Trichlorobenzyl diethylcarbamate. | Severe phytotoxicity to morning glory, wild oats, brome grass, rye grass, sugar beets, crab grass, pigweed, soybean, wild buckwheat and tomato; moderate phytotoxicity to radish and barnyard grass. |
| ar,ar,ar-Trichlorobenzyl diisopropylcarbamate. | Severe phytotoxicity to morning glory, sugar beets and pigweed; moderate phytotoxicity to radish, crab grass, wild buckwheat and tomato. |
| ar,ar,ar-Trichlorobenzyl 1-piperidinecarboxylate. | Severe phytotoxicity to morning glory, sugar beets, pigweed, soybean and tomato; moderate phytotoxicity to radish. |
| ar,ar,ar-Trichlorobenzyl 1-pyrrolidinylcarboxylate. | Severe phytotoxicity to sugar beets, pigweed, soybean and tomato; moderate phytotoxicity to morning glory, brome grass, radish and wild buckwheat. |
| ar,ar,ar-Trichlorobenzyl N,N-bis(2-chloroallyl)-carbamate. | Severe phytotoxicity to morning glory, sugar beets, pigweed, soybean and tomato; moderate phytotoxicity to brome grass, radish and crab grass. |
| ar,ar,ar-Trichlorobenzyl N-(2-chloroallyl)cyclohexane-carbamate. | Severe phytotoxicity to morning glory, sugar beets and pigweed; moderate phytotoxicity to radish and crab grass. |
| ar,ar,ar-Trichlorobenzyl N,N-diallylcarbamate. | Severe phytotoxicity to morning glory, sugar beets, pigweed, soybean and tomato; moderate phytotoxicity to radish. |
| ar,ar,ar-Trichlorobenzyl N-allylcyclohexane-carbamate. | Severe phytotoxicity to morning glory and pigweed. |
| 2,6-dichlorobenzyl diethyl-carbamate. | Severe phytotoxicity to crab grass, pigweed, soybean and tomato; moderate phytotoxicity to morning glory, wild oats, sugar beets, barnyard grass, wild buckwheat and sorghum. |
| 2,6-dichlorobenzyl N-ethyl-cyclohexanecarbamate. | Severe phytotoxicity to morning glory, brome grass, sugar beets and crab grass; moderate phytotoxicity to foxtail. Chlorosisgrass. |

Formative effects on broadleaved plants were exerted in every case. Furthermore, at 1 pound per acre, ar,ar,ar-trichlorobenzyl diisopropylcarbamate was severely toxic to morning glory, sugar beets, pigweed and soybean. 2,5-dichlorobenzyl N-ethylcyclohexanecarbamate, while phytotoxic, is less effective than the 2,6-derivative.

Greater efficiency than from surface application results from incorporating the toxicants into the top layer of soil. Phytotoxicity ratings observed by incorporating the esters into the surface soil are recorded below:

TABLE II

| Toxicant | Lbs./acre | Results observed |
|---|---|---|
| ar,ar,ar-Trichlorobenzyl diisopropylcarbamate. | 1/2 | Severe phytotoxicity to morning glory and tomato; moderate phytotoxicity to sugar beets. |
| ar,ar,ar-Trichlorobenzyl 1-piperidinecarboxylate. | 1/4 | Severe phytotoxicity to morning glory, pigweed and soybean. |
| ar,ar,ar-Trichlorobenzyl 1-pyrrolidinylcarboxylate. | 1/2 | Severe phytotoxicity to morning glory, sugar beets, pigweed and soybean. |
| ar,ar,ar-Trichlorobenzyl N,N-bis(2-chloroallyl)-carbamate. | 1 | Severe phytotoxicity to morning glory, sugar beets, crab grass, pigweed, soybean, wild buckwheat and tomato; moderate phytotoxicity to radish. |
| ar,ar,ar-Trichlorobenzyl N-(2-chloroallyl)-cyclohexanecarbamate. | 1/2 | Moderate phytotoxicity to morning glory and pigweed. |
| ar,ar,ar-Trichlorobenzyl diallylcarbamate. | 1/2 | Severe phytotoxicity to morning glory and pigweed; moderate phytotoxicity to soybean. |
| ar,ar,ar-Trichlorobenzyl N-allylcyclohexane-carbamate. | 1 | Severe phytotoxicity to morning glory, sugar beets, crab grass, pigweed and tomato; moderate phytotoxicity to rye grass. |
| 2,6-dichlorobenzyl N-ethylcyclohexane-carbamate. | 2 | Severe phytotoxicity to morning glory, brome grass, foxtail, crab grass, pigweed, wild buckwheat and sorghum. |

It is noteworthy that the particular structural features herein pointed out are necessary for the valuable herbicidal properties described. For example, benzyl and chloroallyl dithiocarbamates are known to be herbicides, but the corresponding carbamates are not. In herbicide screening tests at 25 pounds per acre in pre-emergence application and at 0.5 percent concentration in foliage application, and employing about twelve different kinds of seeds or test plants, the following gave zero phytotoxicity to every seed or seedling in pre-emergence application at 25 pounds per acre and zero phytotoxicity to every test plant in foliage application at 0.5 percent concentration except that a general rating of 1 on broadleaf species was assigned to 2-chloroallyl diethylcarbamate in foliage application:

2-chloroallyl diethylcarbamate
cis and trans-2,3-dichloroallyl diisopropylcarbamate
2-chloroallyl 1-pyrrolidinecarboxylate
2-chloroallyl 1-piperidinecarboxylate
cis and trans-2,3-dichloroallyl 1-piperidinecarboxylate
cis and trans-2,3-dichloroallyl diallylcarbamate Slight phytotoxicity to broadleaf plants in foliage application is not considered useful herbicidal action. On the other hand, the corresponding dithiocarbamates exerted useful herbicidal activity in pre-emergence application. Not only is the benzyl moiety necessary in the sulfur-free carbamates, but it must contain halogen. For example, benzyl diethylcarbamate and benzyl diisopropylcarbamate applied at a dosage of 5 pounds per acre in pre-emergence tests exerted no herbicidal activity whatsoever. However, numerous carbamates possessing the particular features of the new class are more toxic than the corresponding dithiocarbamates. These differences are illustrated by adding the numerical phytotoxicity ratings explained above from pre-emergence applications at 5 pounds per acre. In Table III carbamate indicates the N—C(O)O-moiety, and dithiocarbamate indicates the —N—C(S)S-moiety. The amino radical of which the nitrogen of the aforesaid moieties is a part and the benzyl radical attached to sulfur or oxygen are indicated together with the total phytotoxicities from surface application. ar,ar,ar-Trichlorobenzyl diethyldithiocarbamate exerts a formative effect on broad-leaf plants. At 5 pounds per acre mustard, clover and sugar beet were abnormal, and a severe formative effect was observed on cucumber, but the chemical had little effect on most grasses. On the other hand, ar,ar,ar-trichlorobenzyl diethylcarbamate was phytotoxic to grasses. The first line of Table III records the total phytotoxicities of the two compounds to wild oat, brome grass and rye grass. The data show that these two herbicides have distinctly different uses.

As noted above, ar,ar,ar-trichlorobenzyl refers to a radical which is predominately the 2,3,6-isomer. ar,ar,ar-Trichlorobenzyl 1 - piperidinecarboxylate and 2,3,6-trichlorobenzyl 1 - piperidinecarbodithioate were tested against a plant spectrum consisting of morning glory, wild oat, brome grass, rye grass, radish, sugar beet, foxtail, crab grass, pigweed, soybean, wild buckwheat, tomato and sorghum. The total of the phytotoxicities recorded below shows that the carbamate was about three times as toxic as the dithiocarbamate. The same plant spectrum was used in testing 2,6-dichlorobenzyl N-ethylcyclohexanecarbamate and dithiocarbamate, respectively. Again it was observed that the carbamate was significantly more toxic than the known herbicide.

TABLE III.—SUM OF PHYTOTOXICITY RATINGS

| Benzyl radial | Amino radical | Carbamate | Dithiocarbamate |
|---|---|---|---|
| ar,ar,ar-Trichlorobenzyl | Diethylamino | 9 | 0 |
| Do | Piperidino | 18 | |
| 2,3,6-trichlorobenzyl | do | | 6 |
| 2,6-dichlorobenzyl | N-cyclohexyl, N-ethylamino | 20 | 12 |

For the compounding of mineral oils the new compounds are preferably incorporated in amounts of 1 to 10%. In most cases the compounds are completely miscible in all proportions, and mineral oil concentrates may be prepared.

The term "surfactant" as employed in the specification and in the appended claim is used as in volume II of Schwartz, Perry and Bersch's Surface Active Agents and Detergents (1958, Interscience Publishers, Inc., New York) in place of the expression "emulsifying agent" to connote generically the various "emulsifying agents," "dispersing agents," "wetting agents" and "spreading agents" that are adapted to be admixed with the active compounds of this invention in order to secure better wetting and spreading of the compound in water vehicle or carrier in which it is insoluble through lowering the surface tension of the water (see also Frear Chemistry of Insecticides, Fungicides and Herbicides, second edition, page 280). These surfactants include the well-known capillary-active substances which may be anion-active (or anionic), cation active (or cationic), or non-ionizing (or non-ionic), which are described in detail in volumes I and II of Schwartz, Perry and Bersch's Surface Active Agents and Detergents (1958, Interscience Publishers, Inc., New York) and also in the November 1947, issue of Chemical Industries (pages 811–824) in an article entitled, "Synthetic Detergents," by John W. McCutcheon and also in the July, August, September, and October 1952, issues of Soap and Sanitary Chemicals under the title "Synthetic Detergents." The preferred surfactants are the water-soluble anionic surface-active agents and the water-soluble non-ionic surface-active agents set forth in U.S. Patent No. 2,846,398 (issued Aug. 5, 1958). In general it is preferred that a mixture of water-soluble anionic and water-soluble non-ionic surfactants be employed.

It is intended to cover all changes and modifications of the examples of the invention herein chosen for purposes of disclosure which do not constitute departures from the spirit and scope of the invention.

What is claimed is:

1. Compound of the formula

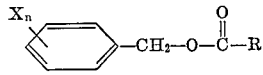

where X is halogen, $n$ is an integer which is one of 2 and 3, and R is amino having nitrogen attached directly to carbonyl and is selected from the group consisting of disubstituted $NH_2$ wherein the substituents are selected from the group consisting of lower alkyl, alkoxy lower alkyl, lower olefinic, lower halo olefinic, and cyclohexyl with the proviso that not more than one is cyclohexyl and heterocyclic amino derived from amines of the group consisting of pyrrolidine, piperidine, 2-methyl-1-piperidine, 5-ethyl-2-methyl-1-piperidine, 5-ethyl-3-methyl-1-piperidine, 2,4,6-trimethyl-1-piperidine, and hexamethylenimine.

2. Compound of the formula

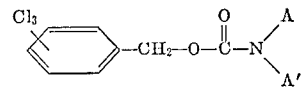

where A and A' are lower alkyl.

3. 2,6-dichloro benzyl ester of di(lower alkyl) carbamic acid.

4. 2,5-dichloro benzyl ester of di(lower alkyl) carbamic acid.

5. Compound of the formula

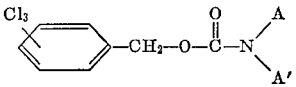

where A and A' are lower olefinic.

6. Compound of the formula

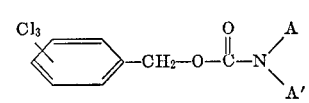

where A and A' are lower halo-olefinic.

7. Compound of the formula

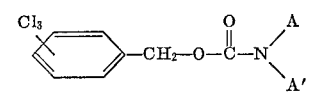

where A is lower alkyl and A' is cyclohexyl.

8. 2,6-dichloro benzyl ester of N-lower alkyl-N-cyclohexylcarbamic acid.

9. 2,5-dichloro benzyl ester of N-lower alkyl-N-cyclohexylcarbamic acid.

10. Compound of the formula

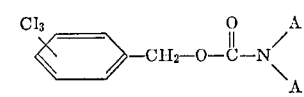

where A is lower olefinic and A' is cyclohexyl.

11. Compound of the formula

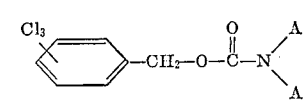

where A is lower halo olefinic and A' is cyclohexyl.

12. Compound of the formula

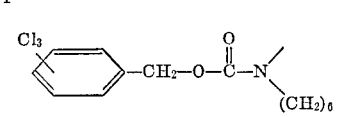

13. Compound of the formula

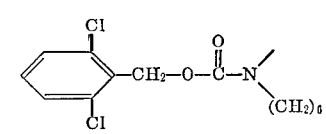

14. Trichlorobenzyl 1-piperidinecarboxylate.
15. Trichlorobenzyl 1-pyrrolidinylcarboxylate.

(References on following page)

References Cited

UNITED STATES PATENTS

| | | | |
|---|---|---|---|
| 2,060,733 | 11/1936 | Hunt et al. | 260—455 |
| 2,160,880 | 6/1936 | Loane et al. | 260—455 |
| 2,812,247 | 11/1957 | Gysin et al. | 71—2.6 |
| 2,992,091 | 7/1961 | Harman et al. | |
| 3,078,153 | 2/1963 | Harman et al. | |

OTHER REFERENCES

Conant: The Chemistry of Organic Compounds (New York, 1957), pp. 264 and 269–271.

Loury et al.: An Introduction to Organic Chemistry (New York, 1945), p. 213.

ALTON D. ROLLINS, *Primary Examiner.*

U.S. Cl. X.R.

71—88, 106; 252—51.5; 260—294.3, 326.3, 468, 482; 424—267, 274, 286 244